(12) United States Patent
Kalley et al.

(10) Patent No.: US 7,077,149 B2
(45) Date of Patent: Jul. 18, 2006

(54) FLUID INJECTION SYSTEM

(75) Inventors: Terrence D. Kalley, Troy, MI (US); John Burke, New Baltimore, MI (US)

(73) Assignee: Bright Solutions, Inc., Troy, MI (US)

( * ) Notice: Subject to any disclaimer, the term of this patent is extended or adjusted under 35 U.S.C. 154(b) by 26 days.

(21) Appl. No.: 10/922,169

(22) Filed: Aug. 20, 2004

(65) Prior Publication Data

US 2005/0081914 A1   Apr. 21, 2005

Related U.S. Application Data

(63) Continuation-in-part of application No. 10/682,805, filed on Oct. 10, 2003, now Pat. No. 6,851,442.

(51) Int. Cl.
*F16L 37/28* (2006.01)

(52) U.S. Cl. ............... 137/1; 137/614.03; 137/563; 62/77; 62/292; 141/1

(58) Field of Classification Search ............ 137/1, 137/614.03, 614.05, 563, 14; 62/77, 292; 141/1, 18
See application file for complete search history.

(56) References Cited

U.S. PATENT DOCUMENTS

| | | | |
|---|---|---|---|
| 2,768,678 A | 10/1956 | Schwank | |
| 4,745,772 A | 5/1988 | Ferris | |
| 4,758,366 A | 7/1988 | Parekh | |
| 4,911,211 A * | 3/1990 | Andersen | 141/382 |
| 4,938,063 A | 7/1990 | Leighley | |
| 5,027,605 A | 7/1991 | Hardesty | |
| 5,149,453 A | 9/1992 | Parekh | |
| 5,167,140 A | 12/1992 | Cooper et al. | |
| 5,349,998 A | 9/1994 | Gonfiantini | |
| 5,357,782 A | 10/1994 | Henry | |
| 5,574,213 A | 11/1996 | Shanley | |
| RE35,395 E | 12/1996 | Henry | |
| 5,650,563 A | 7/1997 | Cooper et al. | |
| 5,740,835 A | 4/1998 | Murphy | |
| 5,826,636 A | 10/1998 | Trigiani | |
| 5,967,204 A | 10/1999 | Ferris et al. | |
| 5,975,151 A | 11/1999 | Packo | |
| 5,975,490 A | 11/1999 | Essman | |
| 6,029,720 A | 2/2000 | Swinford | |
| 6,050,310 A | 4/2000 | Trigiani | |
| 6,056,162 A | 5/2000 | Leighley | |
| 6,070,455 A * | 6/2000 | Cavestri | 73/40.7 |
| 6,155,066 A | 12/2000 | Chandler et al. | |
| 6,164,348 A * | 12/2000 | Rodwell et al. | 141/382 |
| 6,170,541 B1 | 1/2001 | Sanhaji | |
| 6,183,663 B1 | 2/2001 | Kalley et al. | |
| 6,186,197 B1 | 2/2001 | Trigiani | |

(Continued)

OTHER PUBLICATIONS

Davis, "Pinpointing HFC-134a leaks is easy if you use the proper equipment", Air Conditioning, Heating & Refrigeration News, Dec. 7, 1992 pp. 36-41.

(Continued)

*Primary Examiner*—Kevin Lee
(74) *Attorney, Agent, or Firm*—Steptoe & Johnson LLP

(57) ABSTRACT

An apparatus for injecting a fluid into a closed pressurized system can be connected to a service port of the system. The fluid can be introduced into the system using the resting and operating pressures of the closed pressurized system. The system can be a climate control system.

28 Claims, 3 Drawing Sheets

U.S. PATENT DOCUMENTS

| | | |
|---|---|---|
| 6,250,603 B1 | 6/2001 | Knowles et al. |
| 6,296,228 B1 | 10/2001 | Knowles et al. |
| 6,438,970 B1 | 8/2002 | Ferris |
| 6,481,221 B1 | 11/2002 | Ferris |
| 6,539,988 B1 | 4/2003 | Cowan et al. |
| 6,561,237 B1 | 5/2003 | Brass et al. |
| 6,722,141 B1 | 4/2004 | Ferris |
| 6,796,340 B1 | 9/2004 | Ferris |
| 2002/0189265 A1 | 12/2002 | Ferris |

OTHER PUBLICATIONS

Davis, "Pinpointing Vehicle Leaks Faster with Ultraviolet Light", The American Society for Nondestructive Testing, Inc., Nov. 1989, vol. 47, No. 11, pp.1248-1250.

Instructions for Interdynamics Direct Charge R-134a Automotive AC Fluorescent Dye Leak Detector Kit.

"Professional Formula Super Seal Premium Brochure." pp. 1-3.

* cited by examiner

FLUID INJECTION SYSTEM

CLAIM OF PRIORITY

This application is a continuation-in-part of U.S. application Ser. No. 10/682,805, filed Oct. 10, 2003, now U.S. Pat. No. 6,851,442 which is hereby incorporated by reference in its entirety.

TECHNICAL FIELD

This invention relates to a method and apparatus for injecting a fluid into a closed system.

BACKGROUND

Introduction of a fluid into a closed system can require devices and techniques that optimize the neatness and cleanliness of the introduction. The introduction of a fluid can be particularly challenging when the fluid has a color, odor, or is potentially dangerous. One type of fluid and system for which these issues can be important is in leak detection methods developed for fluid systems, such as climate control systems, such as heating, cooling, ventilating, and air conditioning systems, using dyes. Some methods employ emissive substances, such as, for example, fluorescent or phosphorescent dyes that are added to the refrigerants and/or lubricants of a climate control system. Suitable leak detection dyes include naphalimide, perylene, thioxanthane, coumarin, or fluorescein and derivatives thereof. Leaks can be detected by observing light emission from the dye at leak sites resulting from excitation of the dye with a light source having particular illumination characteristics (e.g. at wavelengths suitable to excite the dye and cause light emission from the dye). In general the dyes emit brightly when excited by light in the 190 to 700 nanometer wavelength range.

SUMMARY

In general, a method of introducing a fluid into a closed system includes attaching a first port of an injection apparatus to a service port of the system, attaching a fluid supply reservoir to a second port of the injection apparatus, and transporting a fluid from the fluid supply source through the injection apparatus and into the fluid system. The system can be a closed pressurized system, such as, a climate control system. The fluid supply reservoir can be a reduced pressure container, relative to the closed pressurized system, that includes a fluid, such as a leak detection dye composition including a lubricant and a dye.

In one aspect, a method of introducing a fluid into a closed pressurized system includes attaching a first port of an injection apparatus to a service port of the system, the injection apparatus including a chamber containing the fluid and having a chamber pressure, the system being at a resting pressure, the resting pressure being greater than the chamber pressure, equilibrating the resting pressure and the chamber pressure to a delivery pressure within the chamber, and reducing the resting pressure to an operating pressure in the closed system, thereby transporting the fluid into the system. The delivery pressure is higher than the operating pressure. This pressure differential moves the fluid into the system.

In another aspect, an apparatus for introducing a fluid into a closed pressurized system includes a body including a chamber, a first end and a second end, a coupler at the first end, the coupler being configured to attach to and open a service port of the closed pressurized system, and a fluid loader at the second end, the fluid loader being configured to allow a fluid to be introduced into the chamber. A portion of the body can be transparent, allowing the contents of the chamber to be observed. The body can be a section of a hose. The fluid loader can include a valve and a receiving port configured to connect to a fluid dispenser, or a sealing member. The valve can be a one-way valve. The fluid dispenser can be a syringe having a tip having a diameter that forms a seal when inserted in the receiving port or a tip having a diameter sufficient to pierce the sealing member, such as a needle.

In another aspect, a kit for introducing a fluid into a closed pressurized system includes a fluid injector. The fluid injector includes a body including a chamber, a first end and a second end, a coupler at the first end, the coupler being configured to attach to and open a service port of the closed pressurized system, and a fluid loader at the second end, the fluid loader being configured to allow a fluid to be introduced into the chamber. The kit also includes a fluid dispenser configured to fluidly connect to the fluid loader. The kit can also include a source of the fluid, for example, a bottle or syringe or cartridge containing the fluid.

The method can include loading the chamber of the injection apparatus with the fluid. Loading the chamber can include injecting the fluid into the chamber with a syringe. Injecting the fluid into the chamber with a syringe can include forming a seal between a second port of the injection apparatus and a tip of the syringe and forcing the fluid through the tip and into the chamber, or piercing a sealing member at a second port of the injection apparatus with a needle of the syringe and forcing the fluid through the tip and into the chamber. The seal is sufficient to allow fluid to transfer with minimal leakage. The method can include applying a reduced pressure to the chamber prior to equilibrating the resting pressure and the chamber pressure. The first port can be a low-pressure service port of an air conditioning system.

The system can be a climate control system, such as an air conditioning system. The fluid can include a leak detection dye, for example, a naphthalimide dye, a lubricant, an additive, for example, an additive suitable for introducing into the closed pressurized system, or a performance-enhancing product. The performance-enhancing product can extend the lifetime of the system or give new life to bearings, seals, and all compressor parts, increase cooling capacity, quiet compressor noise, or decrease fuel consumption by reducing friction, thereby improving the compressor's mechanical efficiency and lowering its power consumption. The product may have the effect of reducing the temperature that comes out of the vents. The product can coat the parts better than existing lubricants resulting in longer life for the compressor and certain components.

The chamber pressure can be ambient pressure or less than ambient pressure. Ambient pressure is the pressure of the surrounding environment, which can be atmospheric pressure. The operating pressure can be less than 75% of the resting pressure, or less than half of the resting pressure. Reducing the resting pressure to an operating pressure can include operating the closed pressurized system.

Advantageously, the method and apparatus can allow fluid to be added cleanly, with minimal or reduced spillage, to the closed system, and to minimize or reduce spillage of fluid when the apparatus is removed from the service port easily and reproducibly.

The details of one or more embodiments of the invention are set forth in the accompanying drawings and the descrip-

DETAILED DESCRIPTION

In general, an apparatus for injecting a fluid into a closed pressurized system can be connected to a service port of the system. The fluid can be introduced into the system using the resting and operating pressures of the closed pressurized system. The system can be a climate control system. The method allows a substance to be placed into a closed pressurized system using the system pressure to facilitate the process. The closed pressurized system can be an air conditioning or heating, ventilating and air conditioning system (HVAC). The substance can be an additive, oil, leak detection dye, or performance-enhancing product, for example, a substance that prolongs the life of the system, a system component, or an assembly of system components. The method can have an environmental benefit. For example, the method reduces or minimizes the escape of gases from the system while overcoming the need to use gases from outside the system (such as additional refrigerant) to move the substances into the system under pressure.

An injection apparatus can be assembled and connected to the service port of an inactivated, non-operating closed pressurized system (i.e. in a resting state, not turned on). A chamber having a reduced pressure relative to the pressure in the system of the apparatus containing the fluid, for example, leak detection dye and a lubricant or any other liquid or gas, can be attached to a service port of the system, which can be opened to expose the chamber to the pressure within the system, which is the resting pressure. The chamber will equalize pressure with the system to reach a delivery pressure in the chamber. The climate control system can then be activated (turned on) creating a pressure drop in the system as it reaches an operating pressure. The leak detection dye will be injected into the climate control system as the pressure difference between the operating pressure and the delivery pressure seeks to reequalize.

Figure 1:
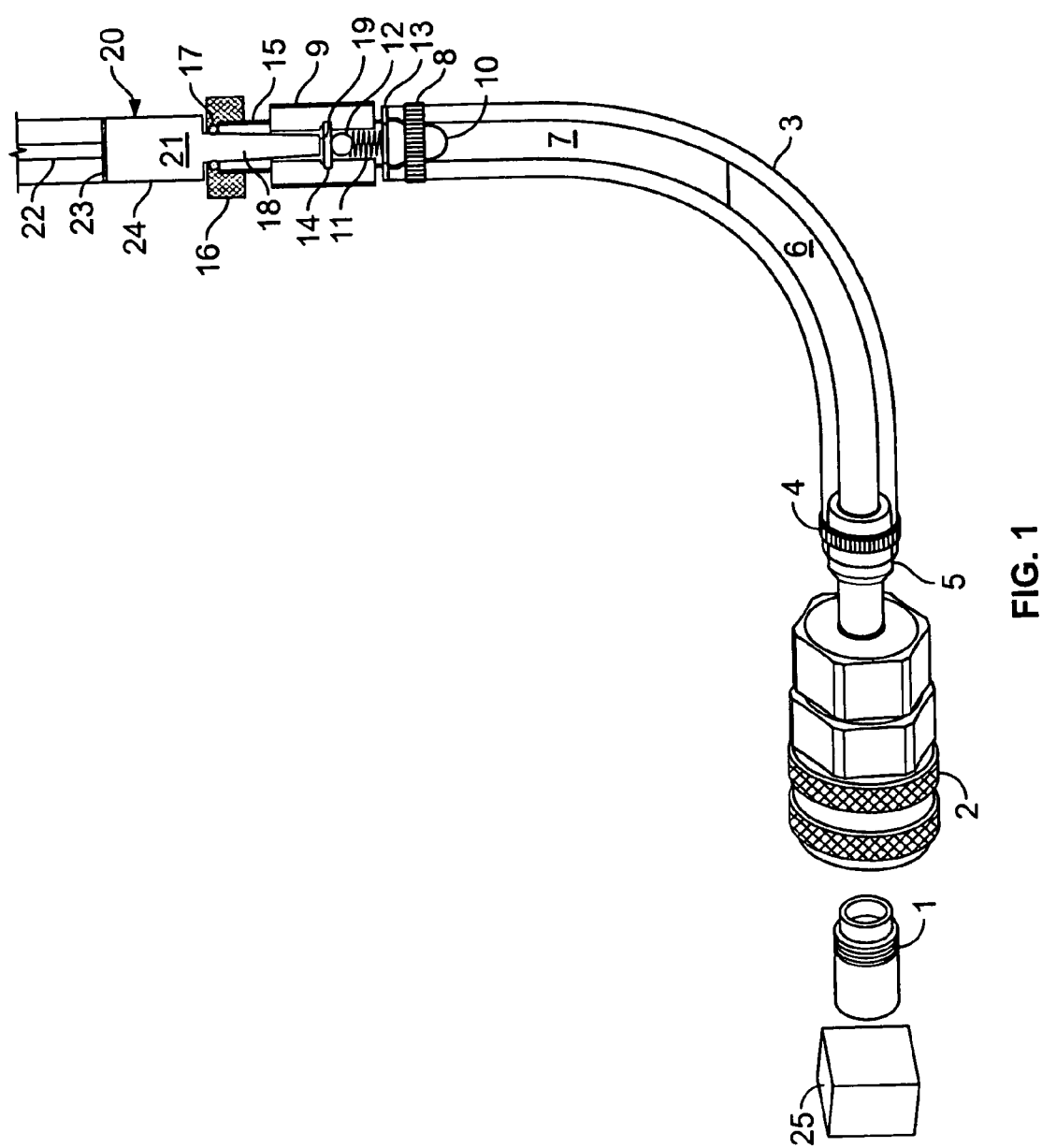
FIG. 1 is a schematic diagram depicting a sectional view of an injection apparatus.

Referring to FIG. 1, an injection apparatus includes a coupler 2 for fluidly connecting to a service port 1 of a closed pressurized system, such as a climate control system. The climate control system can be a mobile system such as an automotive, stationary, window air conditioning system, portable, residential, or commercial air conditioning system or any other hermetic system that employs a pressurized gas or refrigerant. The refrigerant can include a chlorofluorocarbon, a hydrochlorofluorocarbon, a hydrofluorocarbon, carbon dioxide, ammonia, a halogenated or ether derivatives of methane or ethane, or halogenated ether or cyclic derivatives of propane, butane, or other hydrocarbon. Examples of a refrigerant include 1,1,1,2 tetrafluoroethane (R-134a, Allied Signal, Morristown, N.J.) and dichlorodifluoromethane (R-12, DuPont, Wilmington, Del.). The system can also include a lubricant, such as a polyalkylene glycol, a polyolester, a mineral oil, a polyvinyl ether, an alkylbenzene, or other synthetic lubricating material, or combinations thereof.

The coupler 2 can be configured to connect to and open a service port 1 of a system containing R-12, R-134a, or another refrigerant. The service port 1 can be a low-side service port, which accesses the side of the system having a lower pressure than the high-side service port which accesses the side of the system having a higher pressure when the system is operating. Coupler 2 can be a coupler described, for example, in U.S. Pat. Nos. 6,296,228, 6,250,603, and 6,539,970, or U.S. Patent Publication No. 2003-0136142-A1, each of which is incorporated by reference in its entirety. The coupler can also be a threaded connection.

Coupler 2 is fluidly connected to a body 3, which can be a hose. The hose can be clear or partially clear to facilitate observation of the injection process. The hose can be braided to accommodate system pressure, including the resting pressure of the system and the operating pressure of the system. The system contains a gas. When the system is not operating, the pressure is a resting pressure, that is, the same at the low-pressure side and the high-pressure side of the system. When the system is operating, a pressure differential is established which lowers the pressure to an operating pressure from the resting pressure at the low-side service port, and raises the pressure at the high-side service port.

Fastener 4 tightens the body 3 to the coupler 2. When body 3 is a hose, fastener 4 can be a crimp or hose clamp, which attaches the body to coupler 2 at attachment portion 5 of the coupler 2. The attachment portion 5 can be a barb that facilitates the attachment of the body 3 to the coupler 2.

Body 3 includes a substance chamber 6 inside a portion of the body 3 which can contain a substance, or fluid, to be injected into the system. Chamber 6 can be a section of the body 3, not a physically separate chamber in the body 3. A cavity 7 is also present inside a portion of the body 3 that can contain a gas, such as air or another gas, for example, a refrigerant. Cavity 7 can be a section of the body 3, not a physically separate chamber in the body 3.

Fastener 8 tightens the body 3 to the fluid loader 9. When body 3 is a hose, fastener 8 can be a crimp or hose clamp, which attaches the body to fluid loader 9 at attachment portion 10 of the fluid loader 9. The attachment portion 10 can be a barb that facilitates the attachment of the body 3 to the fluid loader 9.

Figure 2:
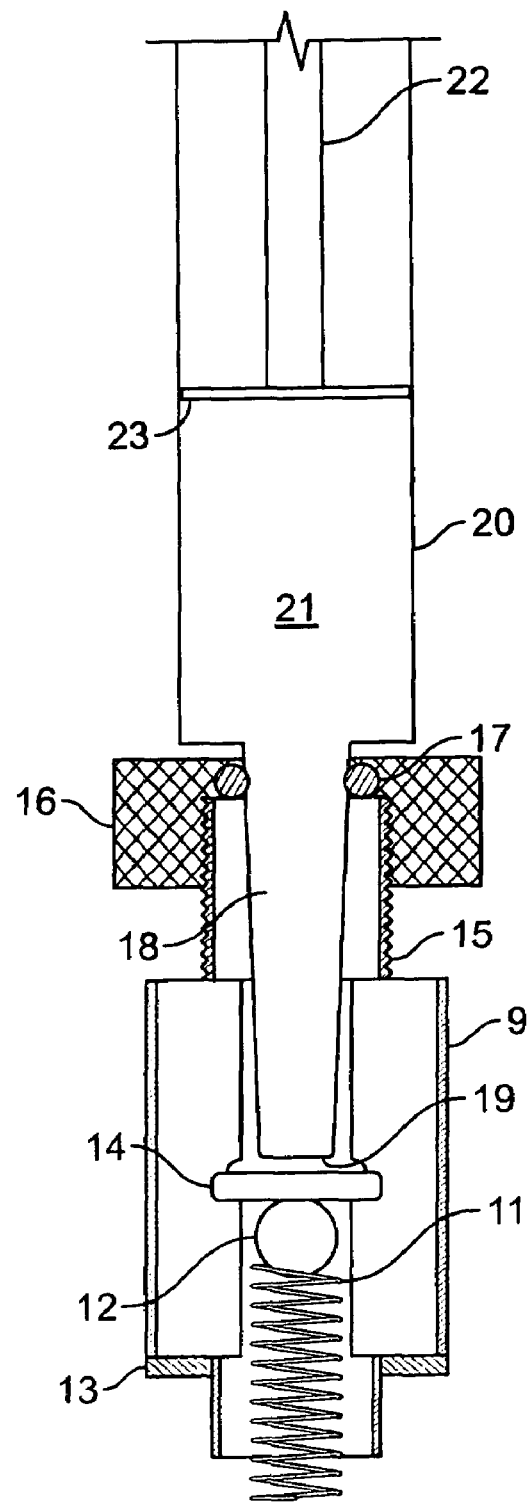
FIG. 2 is a schematic diagram depicting a close-up sectional view of a portion of an injection apparatus.

Referring to FIGS. 1 and 2, fluid loader 9 can be an injection mechanism. The body 3 includes chamber 6 and the cavity 7. The housing of the injection mechanism can be made of metal, of plastic or any other suitable material. Fluid loader 9 includes attachment portion 10, nut 13 and a one-way valve including spring 11, check ball 12, sealing ring 14, threaded region 15, tightening mechanism 16 and sealing ring 17. Tightening mechanism 16 and sealing ring 17 can be attachable or removable components. Nut 13 holds spring 11 and check ball 12 in the housing. Check ball 12 is held against sealing ring 14, which can be an o-ring. Sealing ring 14 acts as a holder for the check ball 12 when the check ball 12 is not under pressure and should form a seal with the check ball 12. The assembly of the check ball 12, spring 11, and sealing ring 14 can be an integral part of fluid loader 9. Tightening mechanism 16 moves over or onto the threaded portion 15 of the fluid loader 9. The tightening mechanism 16 can be a cap with a hole in it. The hole is to facilitate the insertion of a tip 19 of a fluid dispenser 18 through the tightening mechanism 16. Tip 19 forms a seal with sealing ring 17, which can be an o-ring contained within the tightening mechanism 16. Tip 19 can be tapered. If made large enough, the sealing ring 17 can also act as a seat for the tip of the fluid dispenser 19 when the tip is fully seated in the fluid loader 9. Tightening mechanism 16, and ring 17, acts to form a tight grip on the tip 19 when the tightening mechanism is tightened on the threaded portion of the fluid loader 15. The seal can facilitate a cleaner insertion of a substance through the sealing ring 17, as there is preferably no space for the substance to congregate between the tip of the fluid dispenser 18 and the sealing ring 17. The fluid dispenser 18 includes housing 20, which contains chamber 21, which can contain a substance to be injected into the pressurized system. Fluid dispenser 18 can also include plunger handle 22, and plunger head 23. Alternatively, fluid dispenser 18 can open a valve within fluid loader 9, allowing fluid to flow from the dispenser into the chamber. For example, fluid dispenser 18 can be a syringe, cartridge, or bottle that opens a one-way valve when inserted into an opening of fluid loader 9, which then closes when the dispenser is removed. In certain circumstances, the dispenser does not need to be removed during the process.

A storage cap (not shown) can fit over the tip 19 of the fluid dispenser head to prevent the egress of the substance from the container 24 before the fluid dispenser 18 ejects the substance from the chamber 21 of the fluid dispenser. Another optional storage cap (not shown) can fit over the tightening mechanism 16 when the injection mechanism is not in use, which can prevent possible leakage of any excess substance from the fluid injector 9. (Not shown in diagrams). Another optional storage cap (not shown) can fit over the coupler 2 when the coupling mechanism is not in use. This prevents possible leakage of any excess substance from the coupling mechanism 2.

The substance resides in chamber 21 of the housing before insertion into the fluid loader 9. Then the substance (not shown) resides in the body 3 in the chamber 6 before insertion into the pressurized system 25. The substance can be an additive, oil, a leak detection dye, a performance-enhancing product or a substance that prolongs the life of the system or an assembly of system components.

Figure 3:
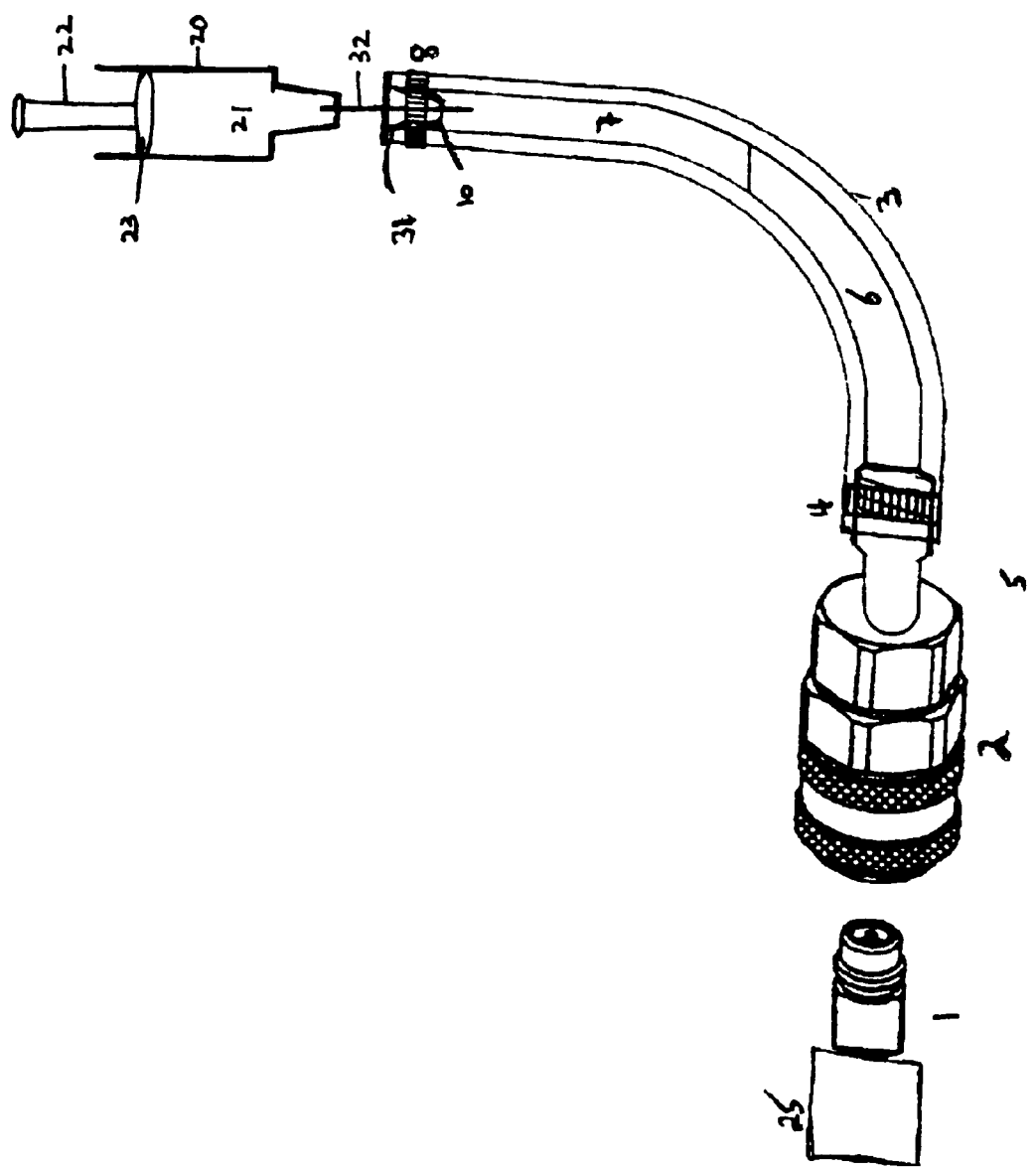
FIG. 3 is a schematic diagram depicting a sectional view of an injection apparatus.

Referring to FIG. 3, a sealing member 31 can include attachment portion 10, which holds sealing member 31 in an end of body 3 with fastener 8. The body 3 includes chamber 6 and the cavity 7. Fastener 4 holds an opposite end of body 3 on attachment portion 5 of coupler 2, which can couple to port 1 of system 25. Sealing member 31 can be used to plug one end of the body 3 and can be pierced with a needle 32 of a syringe 21 and self-seal when the needle is removed. Alternatively, after filling the chamber with fluid, the end can be crimped or melted shut. Any mechanism that seals the end of the body is acceptable.

Materials used for components should be compatible with the substance to be inserted in the system 25 and, where applicable, with the gas in the system. This is particularly true of o-rings, hoses and syringe materials. The materials can also withstand the pressures to be found in the system 25 and in the body 3. The components can be of dimensions sufficient to make the workings of the invention efficient. For example, length of hose should be sufficient to provide space for the substance chamber 6 and the cavity 7. The components can also be shaped to maximize the efficiency of the injection method, such as a tapered insertion on the fluid loader 9 to accept a tapered neck of fluid dispenser 18 and a sufficiently large enough sealing ring, or o-ring, to form an acceptable seal with the check ball 12.

The method of introducing the fluid into the closed pressurized system can be carried out in a variety of ways. In one embodiment, as depicted in FIGS. 1 and 2, the fluid dispenser 18 can have a chamber 21 that is refillable with a source of fluid or pre-filled with fluid. The source of the fluid can be in the form of a pressurized canister, a hose, a container, a bottle, a syringe, or any other fluid transfer or storage apparatus that can be connected to the fluid loader. Specifically, dispenser 18 is inserted into tightening mechanism 16 until the tip 19 rests tightly against sealing ring 14. The closer the fit between the tip 19 and the sealing ring 14, the cleaner the injection process will be with minimized substance spillage. The tightening mechanism 16 is moved over or onto the threaded portion 15 of the fluid loader. This will allow the sealing ring 17 to form a tight grip on the dispenser 18 so that the dispenser 18 is not readily removable from the fluid loader 9 under normal operating conditions. It is possible to avoid the use of the tightening mechanism 16 and to use, for example, manual pressure on the dispenser 18 to hold it in place in the fluid loader 9.

By pushing down on the plunger handle 22 of the syringe, the substance in chamber 21 is forced through the dispenser 18 out of the tip 19, through the sealing ring 14. The pressure of the substance will cause check ball 12 to compress spring 11. This action causes the substance to pass between the sealing ring 14 and the check ball 12 as the check ball 12 and sealing ring 14 will be separated while pressure is exerted by the substance on the check ball 12. The substance will continue to pass through nut 13 and into body 3.

Once all of the substance desired from chamber 21 is forced out of it, syringe plunger 22 is no longer propelled down the housing 20. The lessening of pressure allows check ball 12 to be propelled up to sealing ring 14 by spring 11 where the spring 11 causes the check ball 12 to be forcibly sealed to sealing ring 14. Tightening mechanism 16 can then be loosened, with a resulting decrease of the tension (grip) between sealing ring 17 and dispenser 18. When sufficient loosening has occurred between sealing ring 17 and dispenser 18, the dispenser 18 can then be removed.

The coupler 2 is attached to the service port 1. Body 3 is held in a vertical or near vertical position, the degree of verticality being dictated by the architecture of the pressurized system 25 of which the port 1 is a part or component or by other components either associated with or not associated with the operation of pressurized system 25. The substance in body 3 flows partially but preferably substantially into chamber 6 of the body 3. The action of coupling the coupler 2 to the service port 1 will open the service port and allow fluid communication between the body 3 and the system to which the port 1 is attached or a part of.

This fluid communication will allow a pressurized gas to pass through the service port 1, through the coupler 2, through the chamber 6 and enter the cavity 7, within body 3. The reason that the gas from the system 25 will flow into the cavity 7 is that the pressure of the system 25 will be greater than the pressure in the cavity 7 and the gas pressures equalize in the pressurized system 25 and in cavity 7. The cavity 7 can either be assembled with air in it or with a vacuum or with reduced pressure pulled on it. The reduced pressure can be applied to the coupler. The fluid can be loaded before reducing the pressure. The body 3 can be held in an upright position with the coupler above the loader so the fluid will reside in cavity 7 so that the fluid is not pulled through the coupler during loading while applying reduced pressure. One benefit of assembling it with reduced pressure is that little or no air will enter the system into which the substance is being injected through the service port 1. A second benefit is to decrease the pressure in the cavity 7 thereby facilitating the pressure differential mechanism described just above.

In the case of a charged air conditioning system the resting pressure in the system 25 will be approximately 100 psi. This 100 psi pressure will now also reside in the cavity 7. In the case of a mobile air conditioning system, operating the system 25 by starting the vehicle and turning on the system will reduce the pressure on the low side of the system 25 from roughly 100 psi to 30 psi, in an example of an R-134a mobile air conditioning system. With 100 psi pressure gas in the cavity 7 behind the substance in the chamber 6 and 30 psi pressure of the gas in front of the substance in the system 25, the large pressure differential forces the substance from the chamber 6 into the system 25. It is possible to witness the substance migrating from the substance chamber 6 if the body 3 is clear. If all the substance in the chamber 6 does not leave the body 3 it may be necessary to repeat cycling the resting pressure and operating pressure by switching off the vehicle and allowing the system to sit idly for a few moments.

Once the substance in the chamber 6 is adequately removed from the body 3, disconnect the coupler 2 from the port 1 before turning off the vehicle. This will keep the gas pressure low in the cavity 7 and facilitate the next injection of the substance from dispenser 18 into body 3 through the mechanism outlined above.

In another embodiment, termed a single application embodiment, the injection apparatus is used once. This embodiment does not need the fluid loader 9 or a fluid dispenser 18. The refillable embodiment can use a stopper 31, or any other mechanism for sealing the body, such as a barbed stopper or plug. In this embodiment, the body 3 is pre-filled into the chamber 6 with the substance. A vacuum can then be pulled on the cavity 7 or the air can be left in the cavity 7. Then, the stopper 31 is placed in the body 3 at one end in order to seal that end of body 3.

In another embodiment, the stopper 31 can be removable. The body 3 is refillable, either through a fluid dispenser 18 or poured from a bottle, container, or through another mechanism. After usage, the stopper 31 can be removed from the body 3, the substance can be dispensed into the body 3, and then stopper 31 can be replaced. To prevent the stopper 31 from coming loose under pressure, a fastener 8 can be used. The fastener can be reusable. This embodiment does not employ the fluid loader 9.

In another embodiment, the stopper 31 can be penetrated by a piercing mechanism such as a needle (not shown). The material composition of the stopper 31 can be self-sealing, such as a rubber septum, thereby permitting repeatable insertions of the substance into the body 3. This embodiment does not employ the fluid loader 9 but does involve use of the dispenser 18.

To ensure complete or near complete addition of the fluid, the fluid path wetted surface area within the body can be minimized. Furthermore, the body can be angled between the first and second ports to allow gravity to assist in the addition operation, and to ensure complete or near-complete fluid addition especially for service ports that would otherwise be horizontal.

The method and apparatus can be used to introduce a leak detection dye composition into a climate control system. O-rings and seals or gaskets can be butyl or silicon rubber or various other O-ring and gasket material. Suitable materials of construction for other portions of the apparatus include plastics, stainless steel and aluminum. The springs can be made using a suitable metal or other suitable flexible material.

After the leak detection dye has been loaded into the climate control system, the system is operated to circulate the leak detection dye composition. The circulating refrigerant disperses the leak detection dye throughout the system. Typically the dye content of the system can be below about 0.1 percent. After the dye has been allowed to circulate within the system, the system joints, components, or attachments can be examined with a light source having a wavelength from 190 nanometers to 700 nanometers. The presence of a leak can be determined by a colored visual indication such as fluorescence or other light emission that can be detected after excitation with the light from the light source. Alternatively, if the leak detection composition includes a visible leak detection dye, visible to the unaided eye, the presence of the leak can be determined by visual inspection of the climate control system.

The fluid can include leak detection dye such as a fluorescent dye. The fluorescent dye can include a naphthalimide dye, a perylene dye, a coumarin dye, a thioxane dye, a fluorescein dye, or a derivative thereof or other dye compatible with a climate control systems. The fluorescent dye can be liquid or solid, such as a powder. Examples of suitable dyes include liquid dyes, for example, STAY-BRITE BSL714 (Bright Solutions, Troy Mich.), DAY GLOW TRY-33 (Day Glow Color Corp, Cleveland, Ohio), R-12 Dye STAY-BRITE BSL713, (part B713012), or R-134a Dye STAY-BRITE BSL712, (part B712012) or other dyes.

Other embodiments are within the claims.

What is claimed is:

1. A method of introducing a fluid into a closed pressurized system comprising:
   attaching a first port of an injection apparatus to a service port of the system, the injection apparatus including a chamber containing the fluid and having a chamber pressure, the system being at a resting pressure, the resting pressure being greater than the chamber pressure;
   equilibrating the resting pressure and the chamber pressure to a delivery pressure within the chamber; and
   reducing the resting pressure to an operating pressure in the closed system, thereby transporting the fluid into the system.

2. The method of claim 1, further comprising loading the chamber of the injection apparatus with the fluid.

3. The method of claim 2, wherein loading the chamber includes injecting the fluid into the chamber with a syringe.

4. The method of claim 3, wherein injecting the fluid into the chamber with a syringe includes forming a seal between a second port of the injection apparatus and a tip of the syringe and forcing the fluid through the tip and into the chamber.

5. The method of claim 1, further comprising applying a reduced pressure to the chamber prior to equilibrating the resting pressure and the chamber pressure.

6. The method of claim 1 wherein the system is a climate control system.

7. The method of claim 6 wherein the climate control system is an air conditioning system.

8. The method of claim 1 wherein the chamber pressure is ambient pressure.

9. The method of claim 1 wherein the chamber pressure is less than ambient pressure.

10. The method of claim 1 wherein the operating pressure is less than 75% of the resting pressure.

11. The method of claim 1 wherein the operating pressure is less than half of the resting pressure.

12. The method of claim 1 wherein reducing the resting pressure to an operating pressure includes operating the closed pressurized system.

13. The method of claim 1 wherein the first port is a low-pressure service port of an air conditioning system.

14. The method of claim 1 wherein the fluid includes a leak detection dye.

15. The method of claim 14 wherein the dye includes a naphthalimide dye.

16. The method of claim 1 wherein the fluid includes a lubricant.

17. The method of claim 1 wherein the fluid includes an additive.

18. The method of claim 1 wherein the fluid includes a performance-enhancing product.

19. The method of claim 1 wherein the injection apparatus is flexible.

20. An apparatus for introducing a fluid into a closed pressurized system comprising:
   a body including a chamber, a first end and a second end;
   a coupler at the first end, the coupler being configured to attach to and open a service port of the closed pressurized system;
   a fluid loader at the second end, the fluid loader being configured to allow a fluid to be introduced into the chamber;
   a sealing member; and
   a syringe capable of piercing the sealing member.

21. The apparatus of claim 20 wherein a portion of the body is transparent.

22. The apparatus of claim 20 wherein the fluid loader includes a one-way valve and a receiving port configured to connect to a fluid dispenser.

23. The apparatus of claim 22 wherein the fluid dispenser is a syringe having a tip having a diameter that forms a seal when inserted in the receiving port.

24. The apparatus of claim 20 wherein the fluid loader is a sealing member.

25. The apparatus of claim 20 wherein the body is a section of a hose.

26. A kit for introducing a fluid into a closed pressurized system comprising:
   a fluid injector comprising:
      a body including a chamber, a first end and a second end;
      a coupler at the first end, the coupler being configured to attach to and open a service port of the closed pressurized system; and
      a fluid loader at the second end, the fluid loader being configured to allow a fluid to be introduced into the chamber;
   a fluid dispenser configured to fluidly connect to the fluid loader;
   a sealing member; and
   a syringe capable of piercing the sealing member.

27. The kit of claim 26 further comprising a source of the fluid.

28. A method of introducing a fluid into a closed pressurized system comprising:
   attaching a first port of an injection apparatus to a service port of the system, the injection apparatus including a chamber containing the fluid and having a chamber pressure, the system being at a resting pressure, the resting pressure being greater than the chamber pressure;
   equilibrating the resting pressure and the chamber pressure to a delivery pressure within the chamber;
   reducing the resting pressure to an operating pressure in the closed system, thereby transporting the fluid into the system;
   loading the chamber of the injection apparatus with the fluid wherein loading the chamber includes injecting the fluid into the chamber with a syringe; and wherein injecting the fluid into the chamber with a syringe includes piercing a sealing member at a second port of the injection apparatus with a needle of the syringe and forcing the fluid through the tip and into the chamber.

* * * * *